United States Patent

Teremy et al.

[11] Patent Number: 5,710,947
[45] Date of Patent: Jan. 20, 1998

[54] PRESSURE SENSOR CONTROL FOR ELECTRICALLY RESPONSIVE CAMERA FEATURE

[75] Inventors: Paul Teremy, Rochester; David Reynolds Dowe, Holley; Dale Frederick McIntyre, Honeoye Falls, all of N.Y.

[73] Assignee: Eastman Kodak Company, Rochester, N.Y.

[21] Appl. No.: 617,534

[22] Filed: Mar. 15, 1996

Related U.S. Application Data

[63] Continuation of Ser. No. 415,980, Apr. 4, 1995, abandoned.

[51] Int. Cl.$^6$ .............. G03B 17/08; G03B 17/24; G03B 17/00
[52] U.S. Cl. .............. 396/26; 396/313; 396/281
[58] Field of Search .............. 354/75, 76, 266, 354/64, 195.12, 105, 106, 289.12, 400; 396/25, 26, 429, 310, 313, 314, 316, 281

[56] References Cited

U.S. PATENT DOCUMENTS

| | | | |
|---|---|---|---|
| 3,599,548 | 8/1971 | Hennig | 95/11 R |
| 3,950,773 | 4/1976 | Winkler et al. | 354/266 |
| 4,324,472 | 4/1982 | Terada et al. | 354/266 |
| 4,801,793 | 1/1989 | Vaynshteyn | 354/106 |
| 4,999,664 | 3/1991 | Foust | 354/446 |
| 5,111,222 | 5/1992 | Hawakawa et al. | 354/64 |
| 5,153,622 | 10/1992 | Hayakawa et al. | 354/64 |
| 5,155,513 | 10/1992 | Matsumura et al. | 354/106 |
| 5,204,709 | 4/1993 | Sato | 354/266 |
| 5,258,795 | 11/1993 | Lucas | 354/289.17 |
| 5,302,990 | 4/1994 | Satoh et al. | 354/106 |
| 5,311,230 | 5/1994 | Ootwa | 354/195.12 |
| 5,311,242 | 5/1994 | Kunishigo | 354/403 |
| 5,365,290 | 11/1994 | Suzuki et al. | 354/64 |
| 5,412,445 | 5/1995 | Mori et al. | 354/195.1 |
| 5,493,357 | 2/1996 | Hara et al. | 354/195.12 |

OTHER PUBLICATIONS

Force Imaging Technologies, Uniforce Technical Notes, #101 (Feb. 1994), pp. 1–3.

*Primary Examiner*—Safet Metjahic
*Assistant Examiner*—Nicholas J. Tuccillo
*Attorney, Agent, or Firm*—Peter J. Bilinski; Robert Luke Walker

[57] ABSTRACT

A photographic camera, including an electrically responsive camera feature, includes an electrical circuit in communication with the camera feature, the electrical circuit being actuable to operate the feature. A pressure/force sensor having electrical resistance variable in response to pressure application is disposed in the camera electrical circuit such that the application of pressure on the force sensor controls the operation of the feature.

8 Claims, 7 Drawing Sheets

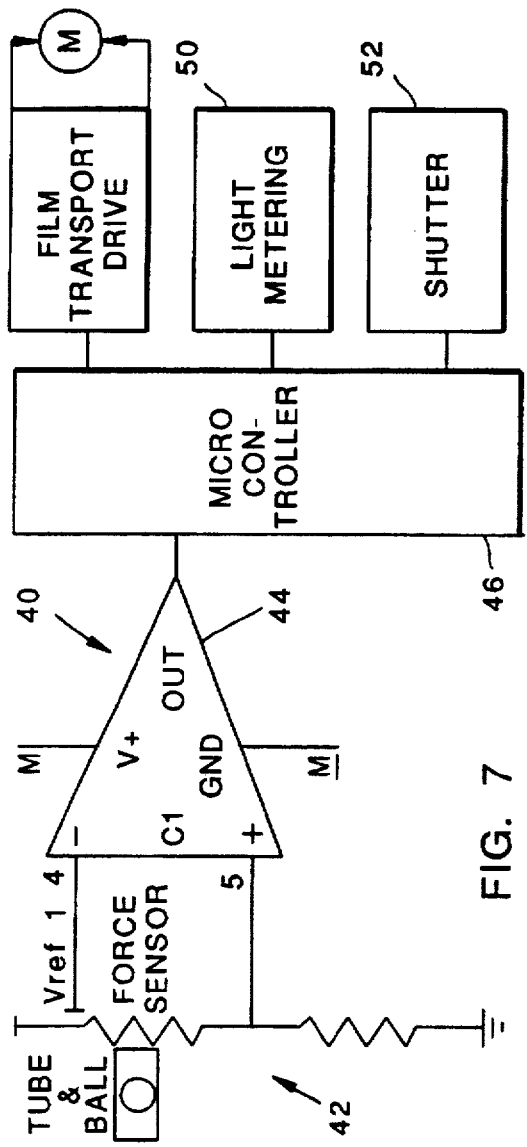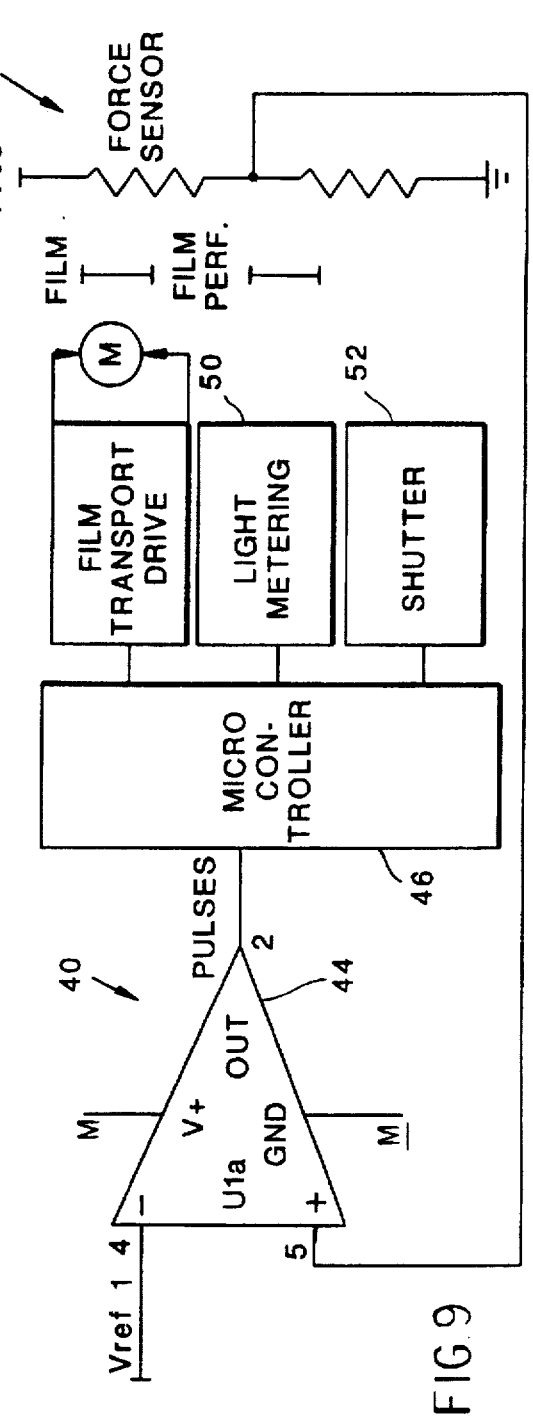
FIG. 7
FIG 9

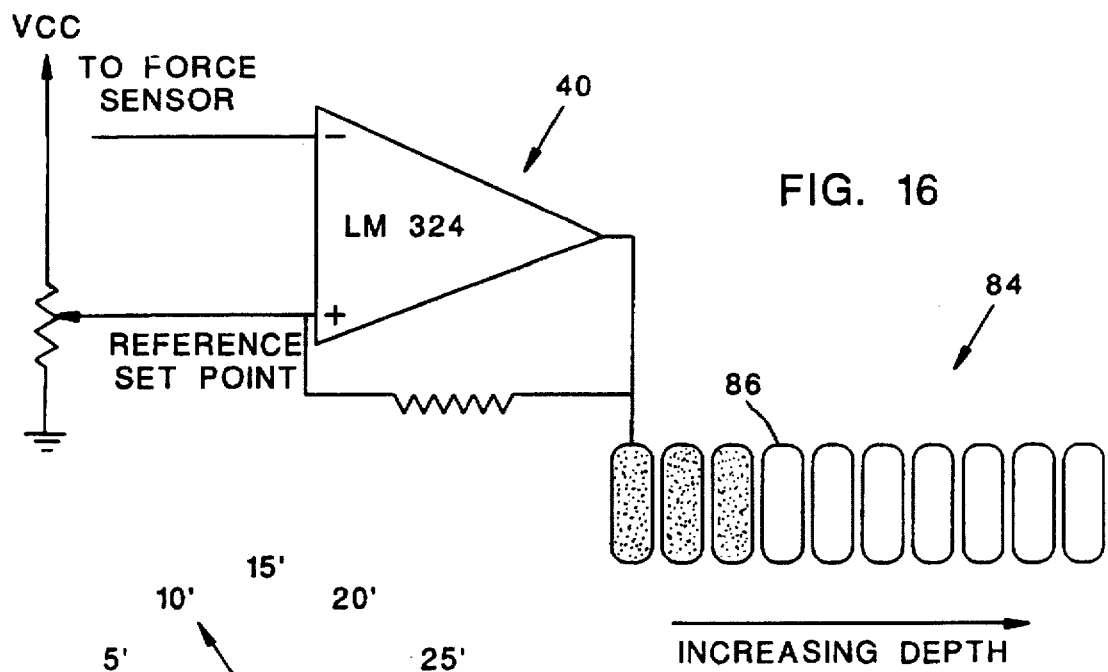
FIG. 16
FIG. 17
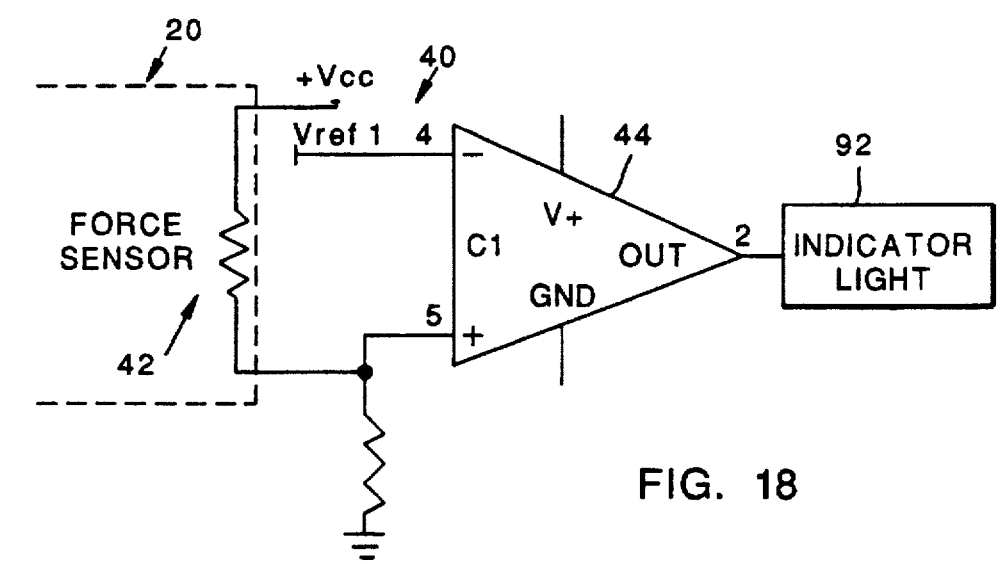
FIG. 18

5,710,947

PRESSURE SENSOR CONTROL FOR ELECTRICALLY RESPONSIVE CAMERA FEATURE

This is a Continuation of application Ser. No. 08/415,980, filed Apr. 4, 1995 now abandoned.

FIELD OF THE INVENTION

This invention relates to photographic cameras having electronically responsive camera features and more particularly to the application of a pressure sensor or force sensor in the camera electrical circuit to control operation of the camera feature.

BACKGROUND OF THE INVENTION

It is known in the art relating to photographic cameras having electronically responsive camera features such as a wake-up switch, trigger switch, orientation switch, film transport counter, lens position sensor or zoom lens motor drive, to utilize complex mechanical or optical devices to control or indicate the operation of the feature. These mechanical and optical devices have spatial requirements that necessitate sufficient camera size for mounting. In addition these devices are not easily customized for specific application.

SUMMARY OF THE INVENTION

The present invention provides a simple pressure sensor in a camera electrical circuit in communication with an electrically responsive camera feature, to control the operation of the camera feature. The pressure sensor, also referred to as a force sensor, has an electrical resistance characteristic responsive to the application of pressure on the force sensor. As pressure is applied and or varied to the force sensor, the camera electrical circuit detects a change in the force sensor resistance and controls the operation of the camera feature.

Use of the simple pressure sensor lessens the spatial requirements and reduces the complexity of a camera design as the sensor can be tailored for the specific camera application. The force sensor can be used as a camera wake-up switch, trigger switch, orientation switch, film transport counter, lens motor rotation sensor, an entry device for writing on film, a water depth sensor, a camera leakage detector and zoom lens motor drive speed control or for operating other electrically responsive camera features.

These and other features and advantages of the invention will be more fully understood from the following detailed description of the invention taken together with the accompanying drawings.

BRIEF DESCRIPTION OF THE DRAWINGS

In the drawings:

FIG. 7 is an electrical schematic view of a circuit for the two-way orientation switch;

FIG. 9 is an electrical schematic view of a circuit for the film transport counter of FIG. 8;

FIG. 16 is an electrical schematic view of an electrical circuit for a water depth sensor including a bar graph indicating system;

FIG. 17 is an electrical schematic view of an electrical circuit for a water depth sensor including a galvanometer indicating system;

FIG. 18 is an electrical schematic view of a circuit for a leakage detector for testing underwater cameras.

DETAILED DESCRIPTION OF THE INVENTION

Figure 4:
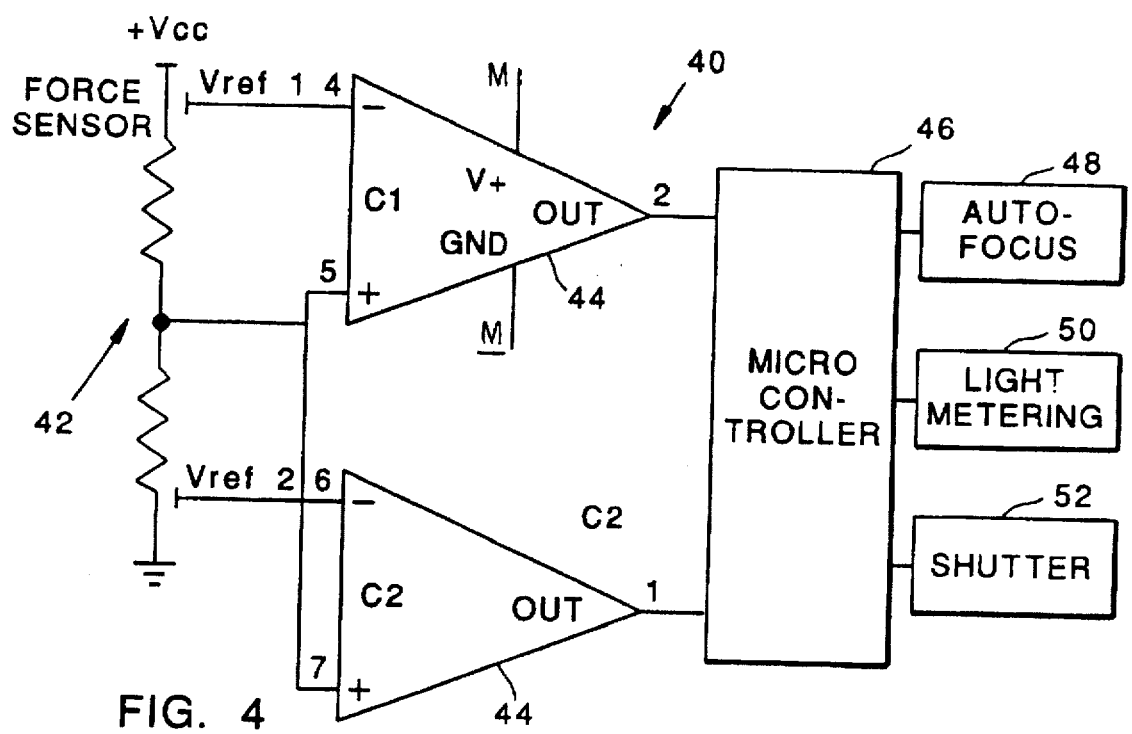
FIG. 4 is an electrical schematic view of a circuit for the two level trigger switch of FIG. 3.

Referring now to the drawings in detail, numerals 20, 20' generally indicate a photographic camera having one or more electrically responsive camera features. As herein illustrated and disclosed, the camera includes a wake-up switch 22, a trigger switch 24, an orientation switch 26, a film transport counter 28, a lens positioning sensor 30, an entry device 32 to write on film, a water depth sensor 34, a camera leakage detector 36, and a zoom lens motor drive speed control 38. It is to be understood that the camera 20, 20' may provide one or any combination of the hereinabove referenced electrically responsive camera features. All of the electrically responsive camera features have been shown together only for purposes of illustration.

As is hereinafter more fully described, each electrically responsive camera feature is in communication with an electrical circuit 40 configured for the specific camera feature. The electrical circuit 40 is actuable to operate the feature. For each electrically responsive camera feature, one or more pressure or force sensor(s) 42 is disposed in the electrical circuit 40 configured for the specific camera feature. The force sensor(s) 42 exhibits variable electrical resistance in response to the application of pressure on the sensor. This variable electrical resistance in the electrical circuit controls the operation of the electrically responsive camera feature.

A pressure sensor 42 such as or similar to the UniForce™ sensor made by Force Imaging Technologies of Chicago, Ill., provides sufficient variable electrical resistance in response to the application of pressure to be used in the camera electrical circuit. This force sensor 42 is made of a layer of special pressure sensitive material sandwiched between two flexible polyester films. The thickness of this sensor 42 is approximately 0.003 inch and it is flexible. Since the manufacturing process is a silk-screening process, the shape of the sensor 42 can be formed to any desired shape. As pressure is applied to the sensor 42, the resistance of the pressure sensitive material decreases from a high to a low resistance. The camera electrical circuit detects the change in the force sensor 42 resistance resulting from a pressure application and executes a specific function which operates one of the electrically responsive camera features. This force sensor 42 has numerous advantages over the conventional input switches or sensors previously used in camera designs as will become apparent.

Figure 1:
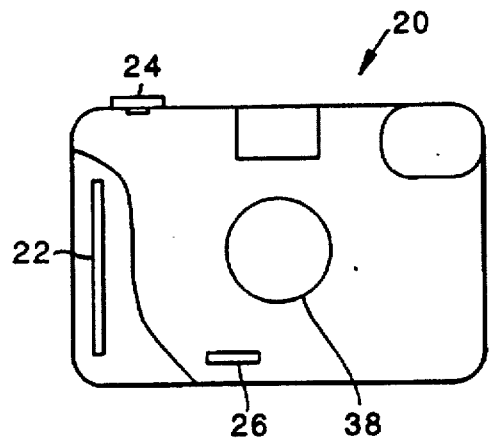
FIG. 1 is a schematic view of a photographic camera including a plurality of electrically responsive camera features, including a wake-up switch, trigger switch, orientation switch, film transport counter, lens motor rotation sensor, an entry device for writing on film, and zoom lens motor drive speed control constructed in accordance with the present invention.
Figure 2:
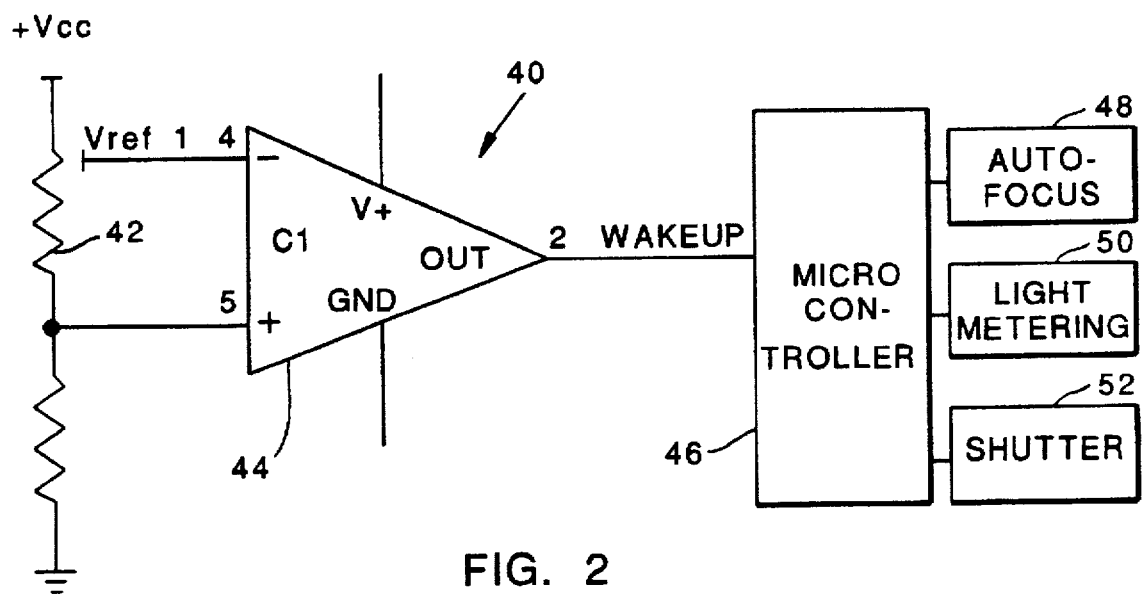
FIG. 2 is an electrical schematic view of a wake-up switch circuit.

Referring to FIGS. 1 and 2, the camera wake-up switch 22 includes a force sensor 42 formed to the camera 20 surface in the area where the camera is most likely to be picked up or held by a picture taker. In the "sleep" mode, the camera 20 monitors the resistance of this pressure sensor 42. As the camera 20 is picked up, a pressure is exerted on this force sensor. A comparator 44 in the camera electrical circuit 40 detects the change in the force sensor 42 output and switches the camera from the "sleep" state to the "awake" state. A camera micro controller 46 in communication with the comparator 44 and downstream features such as autofocus system 48, light metering system 50, and shutter system 52 may be programmed to initiate flash charging or autofocus or other camera functions upon camera "wake-up". Force sensor 42 eliminates presently used complex optical and mechanical force switches. It also reduces the overall size of the camera which is a very important requirement of present camera design. In certain designs this sensor can eliminate the power ON-OFF switch. Placing a wake-up switch on the camera provides a quicker flash charger ready condition because the flash charger circuit is activated as soon as the camera is picked up.

Figure 3:
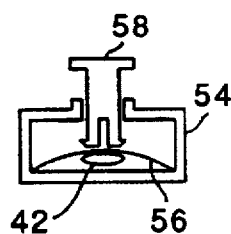
FIG. 3 is a sectional schematic view of a two level trigger switch.

Referring to FIGS. 1, 3, and 4, the camera trigger switch 24 illustrated is a two-level trigger that includes a housing 54 which may be integral with or mounted on the camera 20. The housing 54 includes a sensor support 56 and a force sensor 42 mounted thereon. A push button 58 movably mounted relative to the housing 54 for selectable engagement with the force sensor 42 is operable by the picture taker. As pressure is applied to the force sensor 42, the camera 20 detects the change in the sensor resistance and trips the camera at a first trip point.

In the two-level trigger switch illustrated, the camera electrical circuit 40 detects a specific sensor 42 resistance for its first trip point and a different resistance for the other trip point. The force sensor 42 can be formed into a dome shape point such that when pressed, the dome collapses providing tactile feedback. The advantages of trigger switch 24 are size and simplicity as compared to mechanical trigger switches. Although trigger switch 24 is described as a two-level trigger switch, it becomes apparent that the specific configuration of the switch can be modified to provide one-level or multi-level trip point(s) operation.

Figure 5:
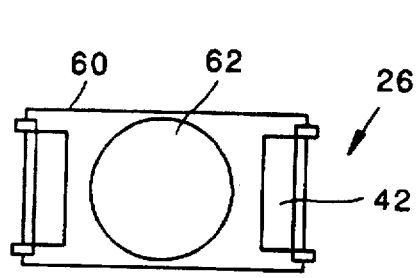
FIG. 5 is a schematic view of a two-way orientation switch.
Figure 6:
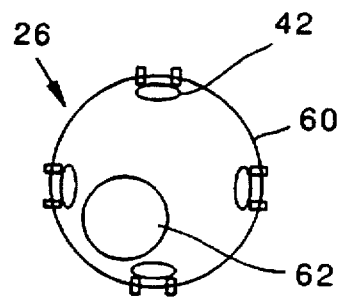
FIG. 6 is a schematic view of a four-way orientation switch.

FIGS. 5, 6, and 7 illustrate two embodiments of the camera orientation switch 26 which is used to indicate the spatial orientation of the camera 20. FIG. 5 illustrates a two-way orientation switch 26 and FIG. 6 illustrates a four-way orientation switch 26'. In each embodiment the orientation switch 26, 26' includes a casing 60 mounted relative to the camera 20. Casing 60 can be a cavity formed into the camera 20. A weight 62, herein shown as a free rolling ball, is movably encased in casing 60. Force sensors 42 are mounted around the insides of casing 60. When the camera 20 is held in an orientation such that the ball 62 is resting on a particular force sensor 42, the resistance of that sensor is decreased. The camera electrical circuit FIG. 7, detects the lower sensor resistance as indicating the orientation of the camera.

Figure 8:
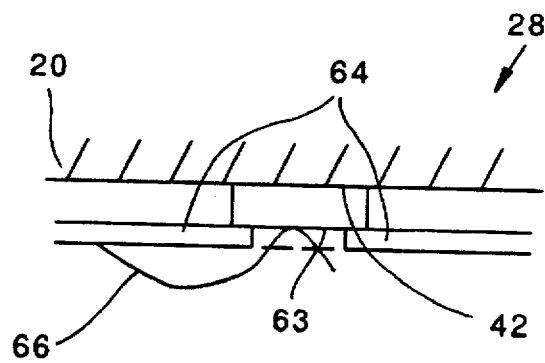
FIG. 8 is a sectional schematic view of a film transport counter.

FIGS. 1, 8, and 9 illustrate the film transport counter 28 that detects and counts the perforated holes 63 on film 64 to track film movement. As illustrated in FIG. 8, a force sensor 42 is mounted on the camera 20 in the camera film path in a position whereby the perforated holes 63 in the film 64 pass over the sensor. A spring 66 urges the film 64 against sensor 42 whereby a resistance value is established. As the film 64 is transported, the perforated holes 63 line up with the force sensor 42, resulting in a lower pressure on the sensor each time the perforated holes pass over the sensor. The camera electrical circuit, FIG. 9, detects the change in sensor resistance and counts the number of perforated holes 63 passing over the sensor. The advantage of this application is that it eliminates a mechanical, rotating coupling.

Figure 10:
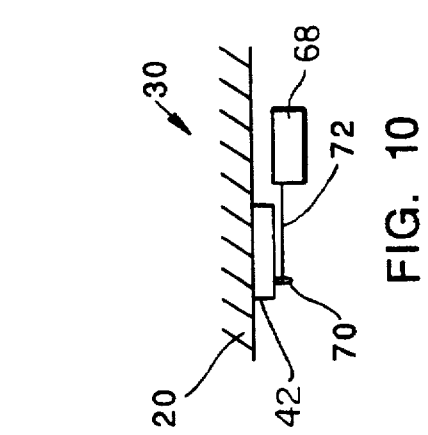
FIG. 10 is a sectional schematic view of a lens motor rotation sensor.
Figure 11:
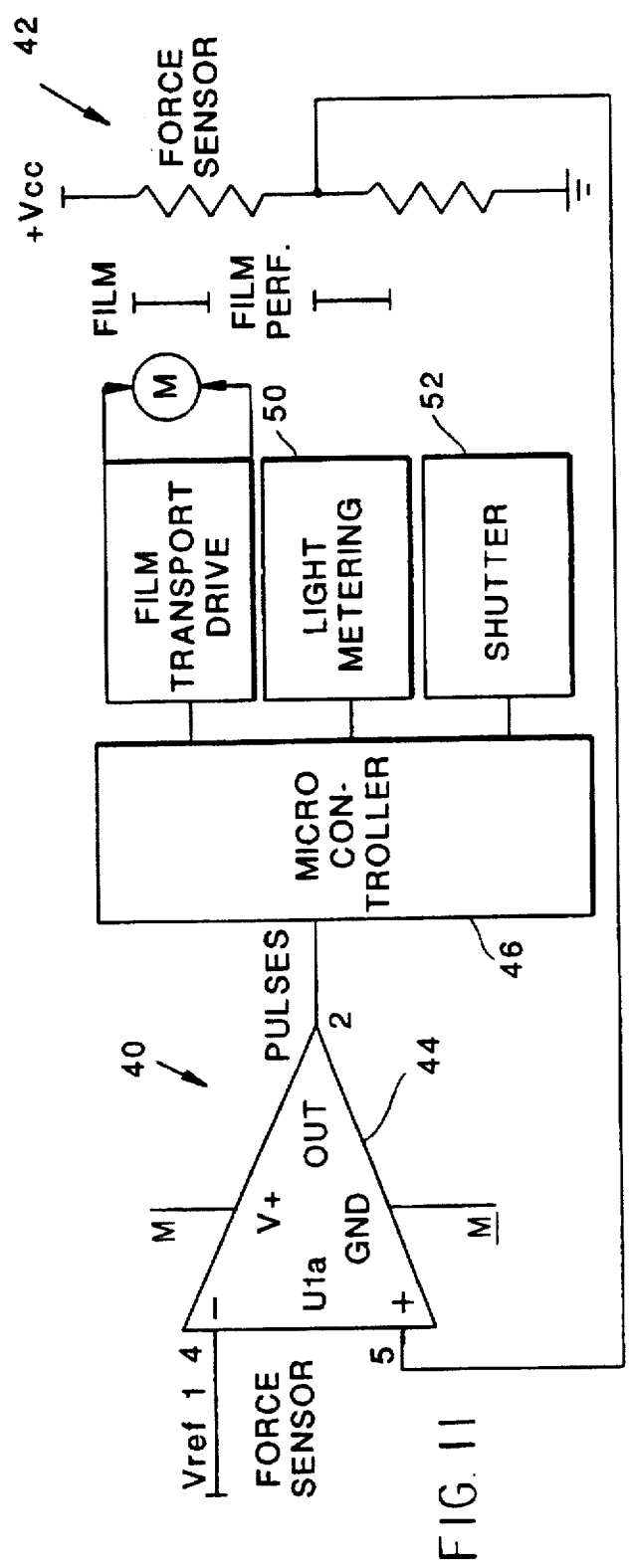
FIG. 11 is an electrical schematic view of a circuit for the lens motor rotation sensor.

FIGS. 1, 10, and 11 illustrate the lens positioning sensor 30 that monitors the position of a movable optical lens 31 driven by an electric motor 68. As illustrated in FIG. 10, the lens positioning sensor 30 includes and uses an eccentric cam element 70 mounted on the drive shaft 72 of the electric motor 68. A force sensor 42 is mounted on the camera 20 in engagement with the cam element 70. As the motor 68 is operated to move the optical lens, the cam element 70 on the motor drive shaft 72 provides a change in pressure on the force sensor 42 which is repeated for each rotation of the drive shaft. The camera electrical circuit, FIG. 11, counts the resulting change in sensor 42 resistance and tracks the lens position. The advantage of this application is that it eliminates a mechanically coupled wheel assembly and is smaller in size vis-a-vis conventional optical interrupters.

Figure 12:
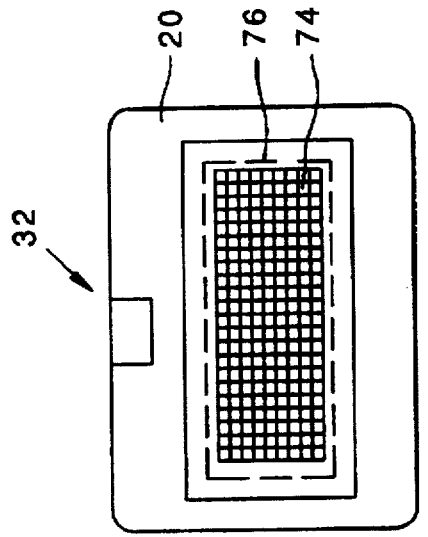
FIG. 12 is a schematic view of a photographic camera including an entry device to write on film constructed in accordance with one embodiment of the invention disposed in the back of the camera.
Figure 13:
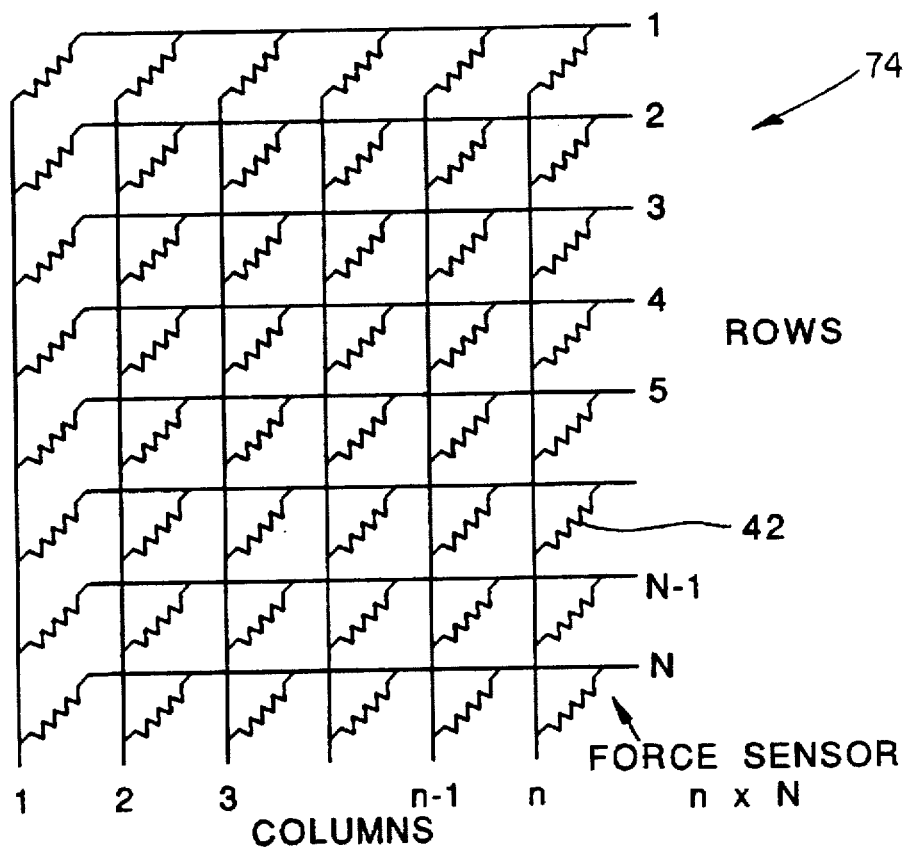
FIG. 13 is an enlarged sectional view of an array of force sensors illustrating the construction of the entry device.

FIGS. 12 and 13 illustrate the entry device 32 which allows the picture taker to write on the film. As illustrated in FIG. 12, a plurality of the force sensors 42 are mounted in a two-dimensional array 74 on the back of camera 20. The array 74 forms an interface that can be written on. Preferably, a plastic cover sheet 76 is mounted over the array 74. The pixels of the array are aligned in rows and columns. The force sensor array 74 is multiplexed into a camera interface.

A pressure on any one of the array pixels is read into an electrically erasable programmable read only memory in camera 20 and temporally stored. As a person writes notes, a date or drawings on array 74, the camera 20 stores away the pixels that were pressed by the writing device. These stored images can be written on film by using conventional light emitting diodes or recorded by a magnetic writing head to ferrite coated film.

Figure 14:
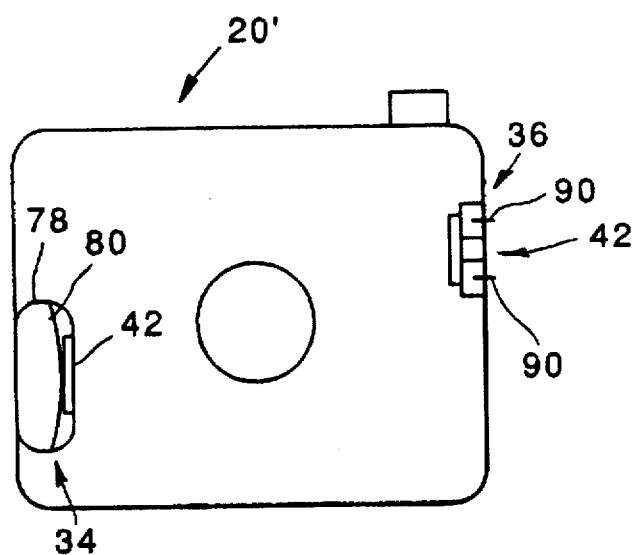
FIG. 14 is a schematic view of an underwater photographic camera including a plurality of electrically responsive camera features including a water depth sensor and a camera leakage detector constructed in accordance with the present invention.

FIGS. 14 thru 17 illustrate an underwater camera 20' and various embodiments of the water depth sensor 34 for measuring the depth of water. As illustrated in FIG. 14, a force sensor 42 is mounted in a cavity 78 of the camera 20'. A movable diaphram 80 closes the opening of the cavity 78. As the camera 20' is submerged, water pressure acting on the diaphram 80 causes the diaphram to press against the force sensor 42. The deeper the camera 20' goes, the greater the water pressure on the diaphram 80 and sensor 42 and thereby the lower the resistance of the sensor.

Figure 15:
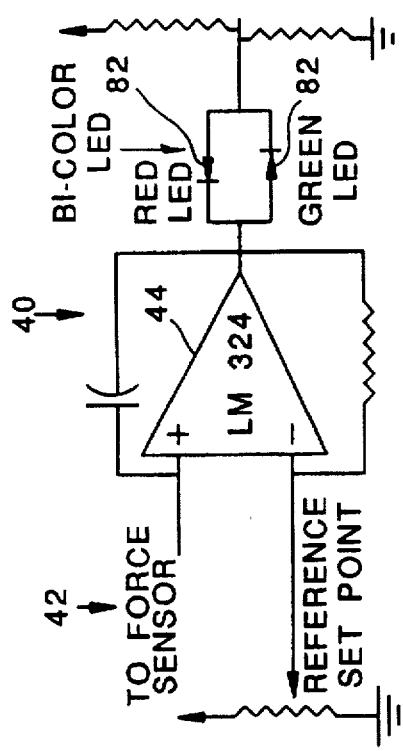
FIG. 15 is an electrical schematic view of an electrical circuit for a water depth sensor including a light indicating system.

FIG. 15 illustrates a camera electrical circuit 40 that provides green (go), yellow (warning), and red (too deep) lights 82 as indicators for the current depth of the camera 20'. The camera electrical circuit 40 includes a comparator 44 that compares the value of resistance as a function of water depth to a reference or set point value of resistance. Preferably, the lights 82 are light emitting diodes.

In another embodiment of the water depth sensor illustrated in FIG. 16, the camera electrical circuit 40 is outputted to a bar graph display 84. In this embodiment, the deeper the camera 20' goes, the more segments 86 of the bar graph 84 light up. In the embodiment of FIG. 17, a galvanometer 88 is connected to the force sensor 42. As the camera 20' goes deeper, the force sensor has less resistance causing the galvanometer 88 to swing further indicating greater depth.

With continuing reference to the subject of underwater cameras, the camera leakage detector 36 is the application of a force sensor 42 inside the camera 20' as illustrated in FIG. 18. Leads 90 connected to the sensor 42 inside the camera 20' are brought outside the camera surface. The leads 90 are connected to a comparator 44 and an indicator 92. The camera 20' can be placed in a pressurized enclosure and the resistance of the force sensor 42 monitored. Testing for camera 20' leakage using such an air leak process is faster and easier than conventional water leak tests.

Figure 19:
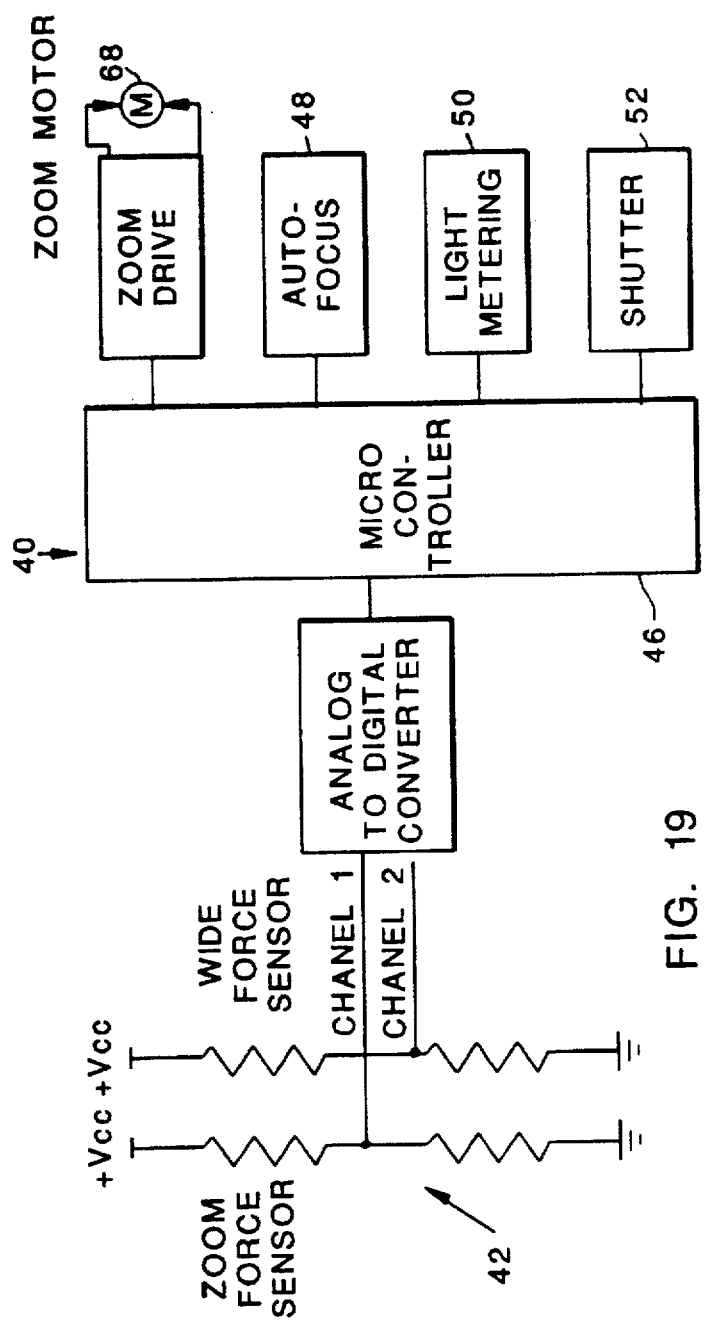
FIG. 19 is an electrical schematic view of a circuit for a zoom lens motor drive speed control.

The zoom lens motor drive 38 is illustrated with reference to FIGS. 1 and 19. The zoom lens motor drive 38 allows the picture taker to control the speed of a conventional motor driven photographic lens assembly by using a force sensor 42 for the telephoto and wide angle push button switches. With reference to FIG. 19, the camera micro controller 46 monitors the pressure placed on these push button force sensors 42 and drives the lens assembly with speed proportionate to the force exerted on the force switches.

The advantage of this application is that speed control of the lens assembly provides a way to make small adjustments of the lens focal length without the overshoot associated with conventional speed controls. Using a force sensor 42 as a motor driver speed control, there is no need to readjust the framing of the picture that usually occurs with current cameras. This application also provides a high speed motion of the lens assembly when a long move is desired. Another benefit is that the sensors 42 are generally 0.003 inch thick and are flexible. Furthermore, sensors 42 can directly replace the normally used mechanical contact type switches which are subject to corrosion over the life of the camera.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 20. photographic camera | 52. shutter system |
| 20'. photographic camera | 54. housing |
| 22. wake-up switch | 56. sensor support |
| 24. trigger switch | 58. push button |
| 26. two-way orientation switch | 60. casing |
| | 62. weight |

| Parts List | |
|---|---|
| 26'. four-way orientation switch | 63. perforated holes |
| | 64. film |
| 28. transport counter | 66. spring |
| 30. lens positioning sensor | 68. electric motor |
| | 70. cam element |
| 32. entry device | 72. drive shaft |
| 34. water depth sensor | 74. two-dimensional array |
| 36. camera leakage detector | 76. cover sheet |
| 38. zoom lens motor drive speed control | 78. cavity |
| | 80. diaphram |
| 40. electrical circuit | 82. lights |
| 42. sensor | 84. bar graph display |
| 44. comparator | |
| 46. camera micro controller | 86. segments |
| | 88. galvanometer |
| 48. autofocus system | 90. leads |
| 50. light metering system | 92. indicator |

What is claimed is:

1. A camera comprising an orientation sensing device for indicating the spatial orientation of said camera, is characterized in that:

said orientation sensing device includes a casing mounted relative to said camera;

a plurality of sensors arranged within said casing each sensor including a pressure sensitive element which varies in electrical resistance based on the amount of external pressure applied thereto;

an unsupported weight movably encased in said casing; and means attached to said plurality of sensors for detecting changes in electrical resistance, wherein gravitational force acting on said unsupported weight causes at least one sensor to be acted upon by said weight, thereby indicating said camera orientation.

2. A camera according to claim 1, wherein said casing includes a cavity and said weight is a ball-like member freely contained within said cavity.

3. A camera comprising a film transport counter for counting perforations in a filmstrip, is characterized in that:

said counter includes a pressure sensitive switch which varies in electrical resistance with the amount of external pressure applied to said switch;

and means for detecting a change in electrical resistance of said pressure sensitive switch, wherein said counter is disposed such that said pressure sensitive switch is in relative urged engagement with said filmstrip so that as perforated holes of the filmstrip move over said pressure actuated switch actuating pressure is reduced, resulting in a lower pressure on said switch and a corresponding detectable change in electrical resistance detected by said detecting means.

4. A camera comprising a lens, a motor for moving the lens within the camera and a lens positioning/motor rotation sensor for tracking the position of said lens, is characterized in that:

said motor includes an eccentric cam on a drive shaft of said motor wherein said lens positioning sensor includes a pressure sensitive element which varies in electrical resistance in relation to the amount of external pressure applied thereto, whereby said eccentric cam contacts said pressure sensitive element on each revolution of said drive shaft;

means for detecting the change in electrical resistance of said pressure sensitive element as said drive shaft is rotated to detect the pressure change each time said pressure sensitive element is contacted by said eccentric cam, thereby tracking said lens position.

5. A camera comprising an entry device for enabling a camera operator to write onto a filmstrip, is characterized in that:

said entry device includes input means comprising a plurality of pressure sensitive switches arranged to form a two dimensional array, wherein each of said switches vary in electrical resistance depending on the amount of external pressure applied thereto; and means for detecting changes in electrical resistance of said pressure sensitive elements, in which pressure imposed on the array is converted into a signal, wherein scripted information written onto said two dimensional array is converted into a plurality of corresponding signals.

6. A camera according to claim 5, including an electrical circuit having an electrically erasable programmable read only memory for storing signals converted by said plurality of sensors from the scripted information and film writing means for converting said signals from the memory into the corresponding scripted information to allow writing of the scripted information onto a filmstrip contained within said camera.

7. A camera comprising a leakage detector for testing underwater cameras, is characterized in that:

said detector includes a first pressure sensitive switch inside said camera;

a second pressure sensitive switch positioned outside said camera in which each of said switches vary in electrical resistance depending upon the amount of external pressure applied thereto; and means for detecting changes in resistance between said first and second switches, to determine changes in pressure between the inside and outside of said camera.

8. A method of writing scripted information onto a filmstrip contained within a camera, comprising the steps of:

i) writing scripted information onto a two dimensional array of pressure sensitive elements, said elements having a variable electrical resistance based on the amount of external pressure applied thereto, said array being disposed on the exterior of said camera;

ii) converting said scripted information written on said array into a set of corresponding signals based on the variability of electrical resistance caused by said writing;

iii) storing said signals into an electronic memory means contained within said camera;

iv) retrieving said set of signals from said electronic memory means; and v) converting said set of signals into said scripted information for selectively writing said information onto said filmstrip.

\* \* \* \* \*